(12) United States Patent
Nelson et al.

(10) Patent No.: US 8,818,398 B1
(45) Date of Patent: Aug. 26, 2014

(54) METHOD AND SYSTEM FOR STREAMLINED LOCATION DETERMINATION WITH ADVANCED COMMUNICATION OF BASE STATION DELAY MEASUREMENTS

(75) Inventors: Rodney D. Nelson, Overland Park, KS (US); Michael P. McMullen, Leawood, KS (US); Bryce A. Jones, Overland Park, KS (US); Geetha R. Thati, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 903 days.

(21) Appl. No.: 12/330,102

(22) Filed: Dec. 8, 2008

(51) Int. Cl.
*H04W 24/00* (2009.01)
(52) U.S. Cl.
USPC .................. 455/456.1; 455/432.1; 455/435.1; 342/464; 701/208
(58) Field of Classification Search
USPC ............................................ 455/456.1, 456.3
See application file for complete search history.

(56) References Cited

U.S. PATENT DOCUMENTS

| | | | |
|---|---|---|---|
| 7,139,820 B1* | 11/2006 | O'Toole et al. | 709/223 |
| 8,275,393 B2* | 9/2012 | Fok et al. | 455/456.2 |
| 8,667,175 B2* | 3/2014 | Thomas et al. | 709/241 |
| 2001/0018349 A1* | 8/2001 | Kinnunen et al. | 455/456 |
| 2002/0082774 A1* | 6/2002 | Bloebaum | 701/213 |
| 2003/0128163 A1* | 7/2003 | Mizugaki et al. | 342/464 |
| 2008/0139220 A1* | 6/2008 | Bae | 455/456.2 |
| 2009/0073031 A1* | 3/2009 | Kim | 342/357.1 |

* cited by examiner

*Primary Examiner* — Liton Miah

(57) ABSTRACT

Disclosed herein is a method and system to help reduce latency in responding to a location based service request from a mobile station. According to the method, the mobile station will include base station delay measurements with the location based service request. That way, when a network entity (such as the location based service provider, or a proxy between the mobile station and the location based service provider) receives the mobile station's request for a location-based service, the entity may readily convey the provided base station delay measurements to the positioning system to enable the positioning system to triangulate the mobile station's location without the need to request the base station delay measurements from the mobile station.

18 Claims, 6 Drawing Sheets

METHOD AND SYSTEM FOR STREAMLINED LOCATION DETERMINATION WITH ADVANCED COMMUNICATION OF BASE STATION DELAY MEASUREMENTS

BACKGROUND

Cellular wireless communication devices, such as a mobile phones and personal digital assistants have become increasingly common in recent years. In general, a cellular wireless device communicates over an air interface with a base station, which provides the device with access to network resources, such as a communication channel to interact with other devices or with network servers.

In a typical cellular wireless communication system, multiple base stations are positioned throughout a market area, and each base station radiates to define a cell, including one or more cell sectors, in which cellular wireless devices can operate. One or more base stations are then typically coupled or integrated with a base station controller, which manages air interface operation such as use of air interface channels and handoff of devices between sectors. In turn, one or more base station controllers may be coupled with a switch (e.g., mobile switching center) or gateway (e.g., packet data serving node) that provides connectivity with a transport network such as the public switched telephone network (PSTN) or the Internet. With this arrangement, a cellular wireless device may communicate via a base station, base station controller, and the switch or gateway, with entities on the transport network.

Air interface communication between the base station and a cellular wireless device may operate in accordance with various air interface protocols, well known examples of which include CDMA (e.g., 1xRTT, 1xEV-DO), iDEN, WiMAX (e.g., IEEE 802.16), TDMA, AMPS, GSM, GPRS, UMTS, and EDGE, among others.

Typically, air-interface communications in each sector are encoded in a manner that distinguishes the communications in that sector from those in adjacent sectors. Further, air-interface communications to and from the base station may be divided into various control and traffic channels, typically through additional encoding or multiplexing. For example, in each sector, a base station may regularly emit a pilot signal that identifies the sector, and devices within range of the base station may then regularly monitor the pilot signal strength as a basis to determine whether to operate in that sector. As another example, to support data or voice communications between a served device and other devices or network servers, the base station may assign the device to communicate on a particular air-interface traffic channel. Further, devices in a sector may send control signals, such as pilot strength measurement messages and traffic channel assignment requests, to the base station via an air-interface access channel, and the base station may send control signals, such as page messages and traffic channel assignment messages, to the devices via an air-interface paging channel.

An important feature of contemporary cellular wireless networks is an ability to locate the geographical position of a mobile station. Such a feature was initially developed to assist emergency services in locating a mobile station. However, the availability of location information to support E911 services has given rise to the development of many other location-based services as well.

For instance, given the location of a mobile station, a location-based service provider/application (e.g., a cellular wireless carrier or third party) in communication with mobile station can provide the mobile station user with a report of weather or traffic in the user's vicinity. As another example, a location-based service provider can report a list of services or establishments (e.g., restaurants, parks, theatres, etc.) in the user's vicinity. And as still another example, a location-based service provider can provide a mobile station user with a map of the user's location or with directions for travel between the user's location and another location.

Typically, a wireless carrier will operate a positioning system that is arranged to determine and report mobile station locations to location based service provider (LBSP) applications (such as 911 service centers or commercial location based information providers). The positioning system may include a mobile positioning center (MPC) and a position determining entity (PDE), which may be integrated together, or may take other forms. And the positioning system may function to determine the location of a given mobile station based on various factors and with varying degrees of granularity.

In usual practice, when a mobile station seeks a location based service (such as an emergency aid dispatched to the mobile station's location, or download of content established or selected based on the mobile station's location), the mobile station may send a location-based service request via a wireless packet data connection to the LBSP (or to another entity, which may send the request (e.g., a derivative of the request) to the LBSP). In response to receipt of that request, the LBSP may then send a query to the mobile station's positioning system, seeking the location of the mobile station. In turn, the positioning system may then invoke a process to determine the mobile station's location and, upon determination of the mobile station's location, may report the location in a response to the LBSP. Based on the mobile station's location, the LBSP may then provide a location-based service (such as delivering emergency aid to the mobile station's location, or delivering to the mobile station content established or selected based on the mobile station's location).

A typical positioning system will determine the location of a mobile station through a triangulation process that takes into account base station signal delay measurements taken and reported by the mobile station. In particular, using known techniques (based on evaluation of signal phase or the like), the mobile station will measure the time that it takes for signals to travel respectively over the air from each of multiple cellular base stations to the mobile station, and the mobile station will report those base station delay measurements to the positioning system. Using those delays, along with the known speed of the signals, the positioning system may then compute the distance between the mobile station and each base station. In turn, for each base station, the positioning system may programmatically define an arc centered around a known fixed position of the base station and having a radius extending the distance from that position to the mobile station. The positioning system may then estimate the mobile station's location as the intersection of those arcs.

In many cases, mobile station location estimated in this manner is sufficient to facilitate providing a location based service. For instance, the estimated location may be sufficient to enable a computer to perform a database lookup to find pizza restaurants or other attractions or points of interest in the mobile station's vicinity, and to deliver that information to the mobile station. Likewise, the estimated location may be sufficient to facilitate dispatch of emergency personnel approximately to the location of the mobile station.

In other cases, it may be desirable to determine the mobile station's location with greater granularity (i.e., with greater precision). To do so, the positioning system may use the estimated location to determine which GPS satellites (or other such satellites) should be in the sky over the mobile station, and the positioning system may then direct the mobile station to tune to those satellites so as to receive satellite signal data. Once the mobile station receives the necessary satellite signal data, the mobile station may then report the data to the positioning system, and the positioning system may then use the satellite signal data as a basis to more accurately compute the mobile station's location.

In any event, the process of determining a mobile station's location may still involve at a minimum considering cellular base station signal delay measurements. Consequently, once the positioning system receives a request for a mobile station's location, the positioning system must generally send a request to the mobile station seeking those delay measurements and would then receive the delay measurements in response from the mobile station. Several mechanisms are well defined to facilitate that request/response communication between the positioning system and the mobile station.

According to one mechanism, known as "control plane" signaling, the positioning system will query a home location register (HLR) to determine the switch that is currently serving the mobile station. The positioning system will then engage in control signaling communication with the switch, possibly according to the well known industry standard 3GPP2 X.P0002/TIA PN-4747 (IS-881) or another standard, to provide a request message (e.g., an IS-881 "SMDPP" message) seeking the desired base station delay measurements from the mobile station. Upon receipt of the request from the positioning system, the switch may then engage in control signaling over the air interface with the mobile station, possibly according to the well known IS-801 standard, to send a position determination (PD) request message seeking the requested base station delay information from the mobile station. The mobile station may then respond by transmitting the base station delay information in an IS-801 PD response message to the switch, and the switch may then send that base station delay information in an smdpp response message to the positioning system.

According to another mechanism, known as "user plane" signaling, the positioning system and mobile station may engage in a higher layer direct communication with each other, through use of Short Messaging Service (SMS) signaling (e.g., via an SMS controller) and/or through IP communication (via a packet-switched network), so that the positioning system can request the data more directly and the mobile station can send the requested data more directly to the positioning system. For instance, the positioning system may send to the mobile station a specially coded SMS message that will trigger the mobile station to respond directly to the positioning system with a mobile originated SMS message that provides the positioning system with certain data, such as base station delay measurements.

While these mechanisms should work well to supply the positioning system with base station delay measurements so as to facilitate determination of mobile station location, the communication between the positioning system and the mobile station itself contributes to the overall latency in responding to a request for mobile station location and thus to the overall latency in responding to a location based service request.

OVERVIEW

Disclosed herein is a method and system that should help to reduce the latency in responding to a location based service request. Recognizing that at least part of the latency stems from the communication that occurs between the positioning system and the mobile station as the positioning system requests and receives base station delay measurements from the mobile station, the disclosed method calls for substantially or completely eliminating that communication step from the process. To do so, the mobile station will include its base station delay measurements with the location based service request that the mobile station sends in the first place. That way, when a network entity (e.g., the LBSP, or a proxy between the mobile station and the LBSP) receives the mobile station's request for a location-based service, the entity may readily convey the provided base station delay measurements to the positioning system to enable the positioning system to readily triangulate the mobile station's location without the need for any entity to request the base station delay measurements from the mobile station.

DETAILED DESCRIPTION

Figure 1:
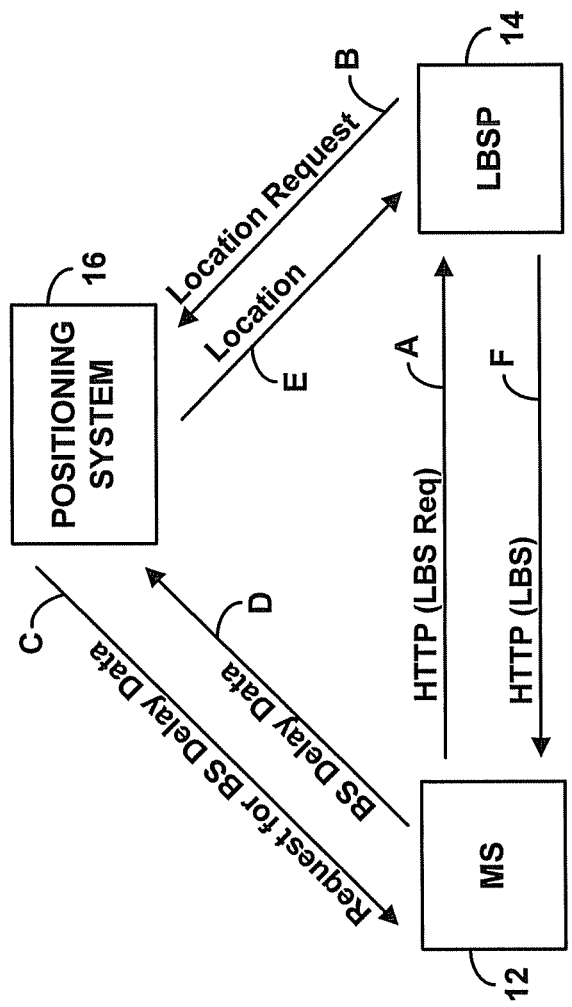
FIG. 1 is a simplified block diagram depicting a prior art arrangement and signaling used to request and receive a location based service.

Referring to the drawings, as noted above, FIG. 1 is a simplified block diagram of a prior art arrangement and signaling for requesting and receiving a location based service. The figure generally depicts a mobile station 12, a location based service provider (LBSP) (e.g., one or more computer servers functioning as the LBSP) 14, and a positioning system 16.

As a general matter, with this arrangement, mobile station 12 may transmit to LBSP 14 a request for a location based service, as shown at step A. The request for location based service may be conveyed by a browser function of mobile station 12 as a hypertext transfer protocol (HTTP) request as shown or may be conveyed in any other manner desired (e.g., using any other signaling or messaging protocol and through any other function of the mobile station). At step B, upon receipt of the location based service request, the LBSP the sends to positioning system 16 a request for the location of the mobile station, keyed to an identifier or address of the mobile station as provided or established by the request from the mobile station.

At step C, in response to the request for location of the mobile station, the positioning system then generates and sends to mobile station (e.g., through control plane signaling or user plane signaling) a request for base station delay measurements. At step D, the mobile station then sends to the positioning system a response message providing the requested base station delay measurements or (e.g., the raw measurements or derivatives of those measurements). At step E, after using those base station delay measurements as a factor to determine the mobile station's location, the positioning system then sends the determined position to the LBSP. And at step F, after using the determined position as a basis to ascertain or establish a service (e.g., information) for the mobile station, the LBSP sends a response message to the mobile station providing the location-based service.

Figure 2:
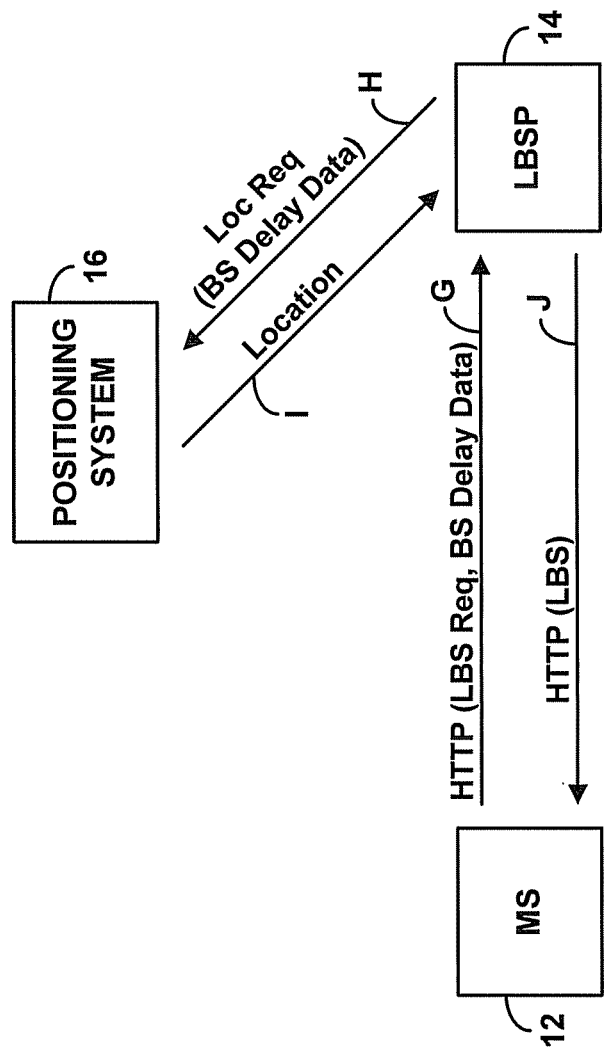
FIG. 2 is a simplified block diagram depicting an arrangement and signaling in accordance with the present method.

Referring next to FIG. 2, an exemplary embodiment of the present method is shown within the same example arrangement as in FIG. 1. In accordance with the exemplary embodiment, FIG. 2 omits base station delay measurement related signaling between the positioning system and the mobile station, because the mobile station instead conveys the base station delay measurement information with its location based service request in the first place.

Thus, as shown in FIG. 2, at step G, the mobile station begins by transmitting to LBSP 14 a request for a location based service, including with the request the mobile station's base station delay measurements. By convention, the mobile station may collect these measurements regularly as the mobile station monitors pilot signals from various base stations in its vicinity; it may provide the data for the strongest three base stations or some others. The mobile station may provide the base station delay measurements with its request for location based service by including the base station delay measurements as data within the request, such as in special header fields or one or more other defined fields or portions of the request. For instance, if the mobile station provides the location based service request in an HTTP message, the mobile station may include the base station delay measurements in one or demarcated portions of the HTTP message.

At step H, upon receipt of the location based service request, the LBSP then sends to positioning system 16 a request for the location of the mobile station, keyed to an identifier or address of the mobile station as provided or established by the request from the mobile station. Advantageously, the LBSP conveniently includes with its request to the positioning system the base station delay measurements provided in the location based service request from the mobile station. The LBSP may provide the delay measurements in one or more predefined fields of the location request that it sends to the positioning system.

Upon receipt of the request for location of the mobile station, and provided with the base station delay measurements, the positioning system 16 may conveniently use the base station delay measurements as a factor to determine the mobile station's location, preferably without the need to request the base station delay measurements from the mobile station and thus without the need to await receipt of the base station delay measurements from the mobile station. (For one reason or another, the positioning system may still request base station delay measurements from the mobile station, such as if the positioning system needs additional measurements. However, the method still advantageously involves providing at least some such measurements with the location based service request and the location request in the first place. Further, the positioning system may engage in other communication with the mobile station, such as to facilitate GPS location determination. However, that does not detract from the advantage of having the mobile station initially provide its base station delay measurements with its location based service request.)

At step I, after using the base station delay measurements as a factor to determine the mobile station's location, the positioning system then sends the determined position to the LBSP. And at step J, after using the determined position as a basis to ascertain or establish a service (e.g., information) for the mobile station, the LBSP sends a response message to the mobile station providing the location-based service.

Figure 3:
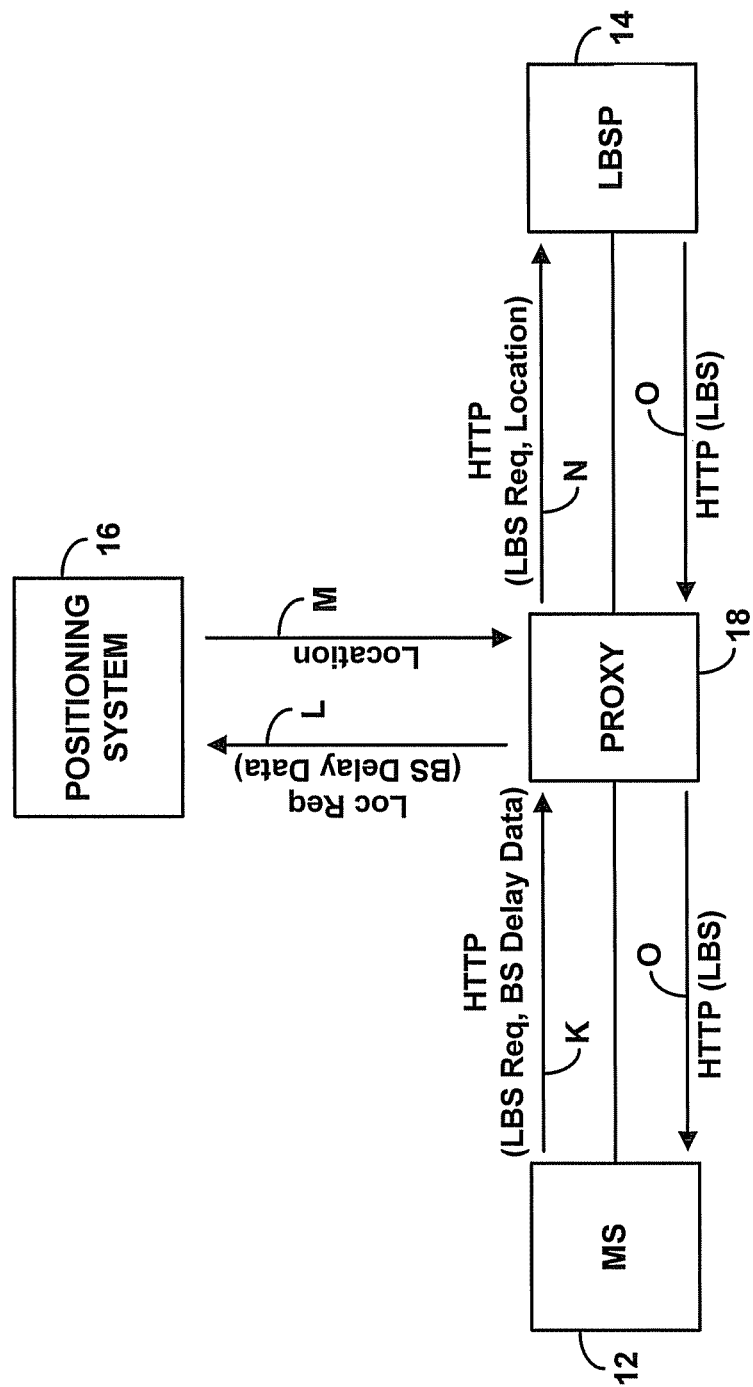
FIG. 3 is a simplified block diagram depicting an alternative arrangement and signaling in accordance with the present method.

FIG. 3 next depicts another arrangement in which the exemplary method can be implemented. In this arrangement, a proxy server 18 or other such entity (e.g., a web portal, a gateway, etc.) sits as an intermediary in a communication path between the mobile station 12 and the LBSP 14, and the proxy server functions to interact with the positioning system and to insert an indication of the mobile station's location into a location based service request being conveyed from the mobile station 12 to the LBSP 14. In this case, the proxy server may be considered to cooperate with the LBSP or perhaps to function as part of the LBSP in terms of the function of obtaining mobile station to facilitate providing a location based service.

As shown in FIG. 3, at step K, the mobile station begins by transmitting to LBSP 14 a request for a location based service, including with the request the mobile station's base station delay measurements. In this case, when the location based service request reaches the proxy server 18 (on its way to the LBSP 14), the proxy server pauses transmission of the request and works with the positioning system 16 to determine the mobile station's location based on the provided base station delay measurements. In particular, as shown at step L, the proxy server sends to the positioning system 16 a request for the location of the mobile station, keyed to an identifier or address of the mobile station as provided or established by the request from the mobile station, and the proxy server conveniently includes with its request to the positioning system the base station delay measurements provided in the location based service request from the mobile station. The proxy server may provide the delay measurements in one or more predefined fields of the location request that it sends to the positioning system.

Upon receipt of the request for location of the mobile station, and provided with the base station delay measurements, the positioning system 16 may conveniently use the base station delay measurements as a factor to determine the mobile station's location, preferably without the need to request the base station delay measurements from the mobile station and thus without the need to await receipt of the base station delay measurements from the mobile station. And at step M, after using the base station delay measurements as a factor to determine the mobile station's location, the positioning system then sends the determined position in a response to the proxy server.

At step N, the proxy server then forwards the mobile station's location based service request along to the LBSP, including with the request the mobile station position provided by the positioning system. The proxy server may include the mobile station position in one or more defined header fields or other portions of the location based service request. (Alternatively, the proxy server may provide the determined location to the LBSP in some other manner that would be considered to be with the request, such as by publishing the location for retrieval by the LBSP and providing with the request to the LBSP some data that the LBSP can use as a basis to retrieve the location. Other examples may be possible as well.) Thus, when the LBSP receives the location based service request from the mobile station, the LBSP receives with the request an indication of the mobile station's location, allowing the LBSP to readily provide the requested location based service. At step O, after using the determined position as a basis to ascertain or establish a service (e.g., information) for the mobile station, the LBSP then sends a response message to the mobile station providing the requested location-based service.

Figure 4:
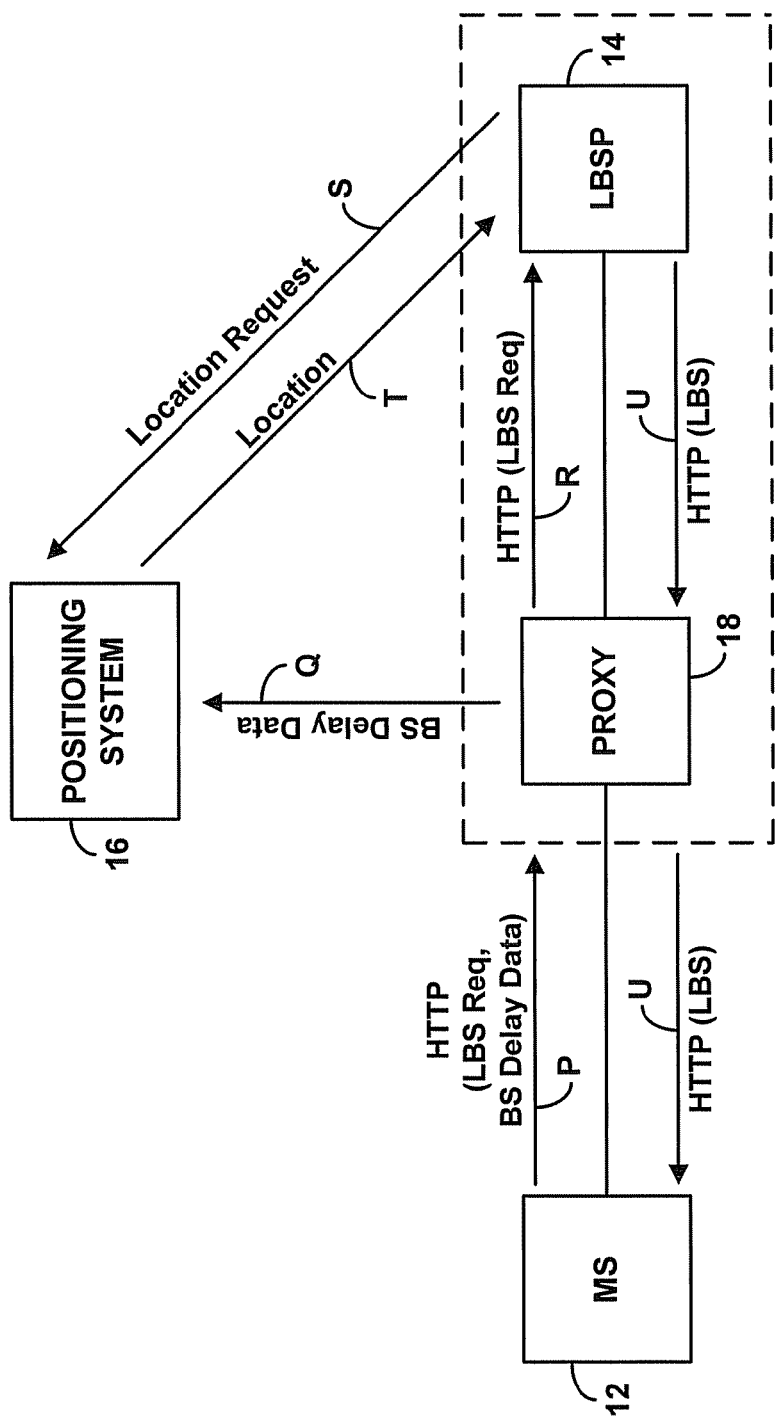
FIG. 4 is a simplified block diagram depicting another alternative arrangement and signaling in accordance with the present method.

FIG. 4 next depicts yet another arrangement, as one of many possible variations on the other arrangements shown, all within the scope presently contemplated. In FIG. 4, the proxy server 18 and LBSP 14 again cooperate to facilitate providing the mobile station with a location based service. Here, when the mobile station's location based service request reaches the proxy server, the proxy server extracts the base station delay measurements from the location based service request, sends the base station delay measurements to the positioning system, and forwards the location based service request along to the LBSP. (The proxy server may strip the base station delay measurements from the location based service request before forwarding the request to the LBSP, so that the LBSP would not receive the base station delay measurements when the LBSP receives the location based service request.) When the LBSP then requests the mobile station's location from the positioning system, the positioning system may thus conveniently use the base station delay measurements provided by the proxy server as a basis to respond. Even more advantageously, the positioning system may begin (and possibly complete) the process of determining the mobile station's location based on the base station delay measurements provided by the proxy server before the positioning system even receives from the LBSP a request for the mobile station's location. This distributed process may thereby further help reduce latency in responding to location based service requests.

As shown in FIG. 4, at step P, the mobile station begins by transmitting to LBSP 14 a request for a location based service, including with the request the mobile station's base station delay measurements. When the location based service request reaches the proxy server 18 (on its way to the LBSP 14), the proxy server sends to the positioning system 16 a message providing the base station delay measurements provided with the location based service request from the mobile station, at step Q. In this process, the proxy server and positioning system may work to uniquely associate the base station delay measurements with the mobile station's request. For instance, the proxy server may assign a unique ID and provide it with the base station delay measurements to the positioning system, or the positioning system may assign a unique ID and provide it in response to the positioning system. Alternatively, timestamps may suffice to provide the association between the base station delay measurements and the mobile station's request.

At step R, the proxy server then forwards the mobile stations' location based service request along to the LBSP. If a unique ID or key was provided to associate with the base station delay measurements, the proxy server may include that unique ID or key in the request forwarded to the LBSP, such as in one or more defined header fields or other portion of the request. At step S, upon receipt of the location based service request, the LBSP sends to positioning system 16 a request for the mobile station's location. If the LBSP received a unique association ID from the proxy server, the LBSP may include that ID with the request it sends to the positioning system, such as in on or more defined header fields or other portions of the request. The positioning system may thereby correlate the request from the LBSP with the provided base station delay measurements. Alternatively, a timestamp in the request from the LBSP to the positioning system may suffice to allow the positioning system to correlate the request with the provided base station delay measurements.

When the positioning system receives the base station delay measurements from the proxy server, the positioning system uses the base station delay measurements as a factor to determine the mobile station's location, again without the need to request the base station delay measurements from the mobile station and without the resulting need to await receipt of the base station delay measurements from the mobile station. The positioning system may begin (and perhaps complete) the location determination process as soon as the positioning system receives the base station delay measurements, and, if the positioning system computes the position before the LBSP requests it, the positioning system may then hold the position data until the LBSP requests it. Alternatively, although less preferably, the positioning system may await receipt of the request for location from the LBSP and then begin computing the position.

At step T, once the positioning system has determined the mobile station's location and the LBSP has requested the location, the positioning system then sends the determined position in response to the LBSP. Alternatively, the positioning system may publish the data in some manner for retrieval by the LBSP or, if the positioning system is aware of the identity of the LBSP, may push the determined location to the LBSP. In any event, the LBSP thereby receives an indication of the mobile station's location, and the LBSP uses the location as a basis to ascertain or establish a service (e.g., information) for the mobile station. At step U, the LBSP then sends a response message to the mobile station, providing the requested location-based service.

The arrangements shown in FIGS. 1-4 generally represent some example configurations and signaling processes in accordance with the present method. Those of ordinary skill in the art will appreciate that the same basic concepts can be applied in numerous configurations of various types, the details of which are not necessarily critical.

Figure 5:
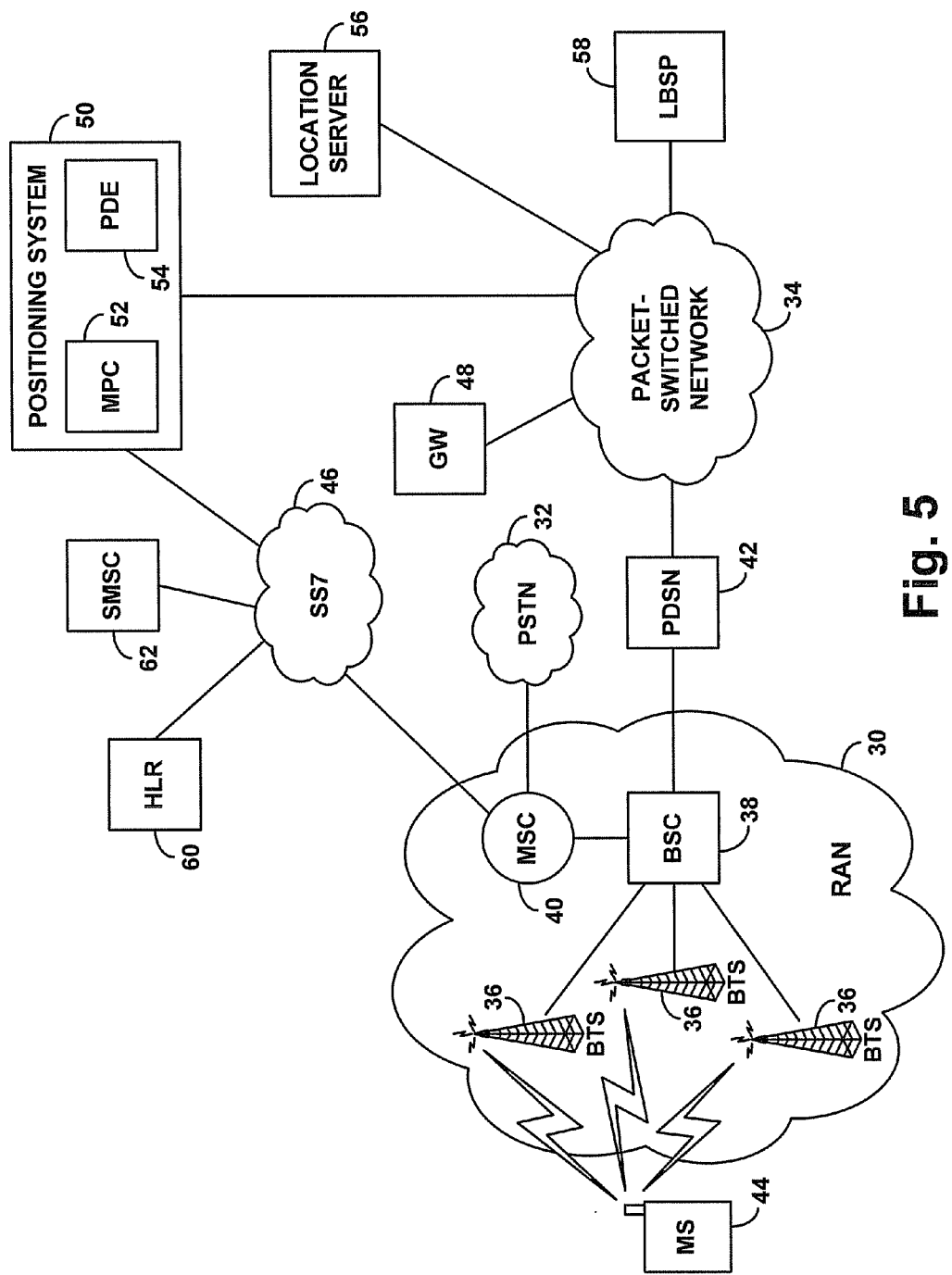
FIG. 5 is a simplified block diagram showing in more detail an example communication system in which the present method can be implemented.

FIG. 5 depicts in greater detail a network arrangement in which the method can be implemented, in line with the generalization of FIG. 1 by way of example. The arrangement of FIG. 5 includes a radio access network (RAN) 30, which functions generally to provide mobile stations with access to one or more transport networks, such as the public switched telephone network (PSTN) 32 and a public or private packet-switched network 34 such as the Internet for instance.

RAN 30 is shown including three representative base transceiver stations (BTSs) 36, each of which radiate to define a cell and one or more cell sectors, and each of which transmit one or more pilot signals (e.g., one per sector) usable by mobile stations to measure signal strength and BTS-MS signal delay in a known manner or in some other manner to be developed later. The representative BTSs are shown coupled with a base station controller (BSC) 38, which is in turn coupled with a mobile switching center (MSC) 40, which provides connectivity with the PSTN 32. Further, the BSC is coupled with a packet data serving node (PDSN) 42, which provides connectivity with a packet-switched network 34. With this arrangement, a representative mobile station 44 can thus communicate through RAN 30 with entities on the PSTN 32 and/or the packet-switched network 34. Those skilled in the art appreciate that other RAN configurations, using other elements or elements with different names, ranging in degree of complexity, are possible as well.

With the example RAN configuration shown and in an example process, to place a call over PSTN 32, mobile station 44 may transmit a call origination message over an air interface access channel to RAN 30, providing dialed digits. Upon receipt of the call origination message, MSC 40 may then direct BSC 38 to assign an air interface traffic channel for use by mobile station to engage in the call, and MSC 40 may set up the call over PSTN 32 to the called number. In particular, MSC 40 may engage in ISDN User Part (ISUP) signaling over a signaling network 46, such as a Signaling System #7 (SS7) network, with a switch serving the called party, in an effort to set up the call over PSTN 32 to that party. Similarly, when MSC 40 receives a request to connect a call to mobile station 44, MSC 40 may page the mobile station 44 over an air interface paging channel and may direct BSC 38 to assign an air interface traffic channel for the call.

To engage in packet-data communication on network 34, mobile station 44 would typically need to acquire a radio layer link, a data layer link, and an IP address, to the extent it does not have these links already. To do so, for instance, the mobile station 44 may transmit a packet-data origination request message over an air interface access channel to RAN 30. Upon receipt of that message, MSC 40 may then forward the message back to BSC 38. BSC 38 may then assign an air interface traffic channel for use by the mobile station as a radio link. Further, BSC 38 may signal to PDSN 42, and PDSN 42 may negotiate with mobile station 44 to establish a point to point protocol (PPP) data link. Still further, PDSN 42 or a mobile-IP home agent (not shown) may assign an IP address for use by mobile station 44 to communicate on network 34.

FIG. 5 shows a gateway 48 sitting as a node on network 34. Gateway 48 may function as a proxy for communications between devices served by RAN 30 and other entities on network 34. Thus, when mobile station 44 engages in packet-switched communication with an entity on network 34, the communications may pass through gateway 48, and gateway 48 may operate on the communications as an intermediary, carrying out one or more beneficial functions. Mobile station 44 may be programmed to route all communications initially to gateway 48 for transmission in turn to destination entities. Alternatively, PDSN 42 may be programmed to pass all communications to gateway 48 for transmission in turn to their destinations. Still alternatively, gateway 48 could be positioned between PDSN 42 and network 34, so that all such communications must pass through gateway 48 on the way to their destinations. Other arrangements are possible as well.

FIG. 5 also depicts an example positioning system 50, which may be operated by the wireless service provider that operates RAN 30 and may be arranged to determine and report mobile station locations to requesting entities as discussed above. As shown, the positioning system 48 may include a mobile positioning center (MPC) 52 and a position determining entity (PDE) 54, which may be integrated together. Further, the figure depicts a location server 56, which the wireless service provider may operate as a front end for receiving location requests from LBSP applications and forwarding those requests to the positioning system 50.

With this arrangement, when the location server 56 receives a location request from an LBSP 58, the location server may send a corresponding location request to the MPC (e.g., via network 34), and the MPC/PDE may, in turn, determine the location of the mobile station. The MPC may then return the determined location of the mobile station to the location server, and the location server may then return to the LBSP the determined location (or a derivation of that data, such as, perhaps, information selected or established based on the location).

As noted above, in existing practice, when an LBSP receives a location based service request from a mobile station and queries a positioning system (in this case location server 56) to determine the mobile station's location, the positioning system would in turn need to obtain base station delay measurements from the mobile station to facilitate computing the mobile station's location through triangulation. In FIG. 5, if the positioning system 50 engages in control plane signaling with the mobile station, the positioning system 50 may first query a home location register (HLR) 60 to determine the MSC serving the mobile station, and the positioning system may then engage in signaling via that MSC to communicate with the mobile station and thereby request and receive base station delay measurements. Alternatively, the positioning system 50 may engage in user plane signaling, such as SMS signaling through a short messaging service center (SMSC) 62 to request and receive the base station delay measurements from the mobile station.

With the benefit of the present invention as described above, the mobile station will instead provide its base station delay measurements with (e.g., in) its location based service request in the first place. Thus, LBSP 58 may transmit the mobile station's base station delay measurements to the positioning system (here, to location server 56, for transmission in turn to positioning system 50) when LBSP first requests the mobile station's location from the positioning system. Alternatively, an intermediate entity such as gateway 48 may extract the base station delay measurements from the mobile station's location based service request and pass the measurements to the positioning system 50 to enable positioning system 50 to determine the mobile station's location. Positioning system 50 may then pass the determined location back to the intermediate entity for transmission along (e.g., with the location based service request) to the destination LBSP 58. Or the LBSP 58 may then query the positioning system 50 to obtain an indication of the mobile station's location, determined based on the base station delay measurements provided to the positioning system.

It should be understood that the method described herein is machine implemented. Namely, the method is carried out by one or more computer processors and hardware. For instance, the mobile station operates a processor and wireless communication interface, to generate and transmit to the RAN a location based service request for transmission to an LBSP, providing in the location based service request a number of base station delay measurements usable by a positioning system to determine the mobile station's location through triangulation as described above. An intermediary in the communication path between the mobile station and the LBSP may then operate a processor and network communication interface to receive the transmitted location based service request and to forward the request along to the LBSP. Further, either the LBSP or the intermediary may operate a processor and network communication interface to extract (e.g., read, decode, etc.) from the location based service request the provided base station delay measurements and to provide the measurements to the positioning system to facilitate determination of the mobile station's location.

In addition, the method described herein provides a physical transformation, by reducing latency for response to a location based service request. Without the benefit of the method, the traditional method as described in the background section above would result in the positioning system needing to request and receive base station delay measurements from the mobile station upon receipt of a request to determine the mobile station's location. Advantageously with the benefit of the present method, that request/receive function can be omitted, thus improving user experience by speeding up response to the mobile station's location based service request.

Figure 6:
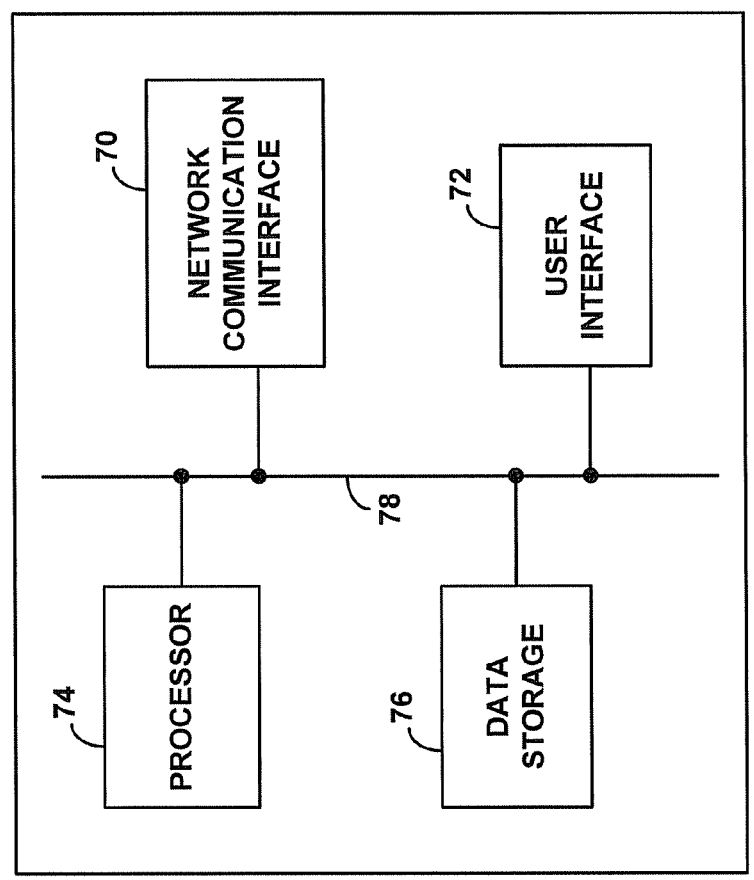
FIG. 6 is a simplified block diagram depicting components of an entity arranged to carry out various functions of the method.

FIG. 6 is a block diagram depicting components that may be included in each of the various entities described above, to facilitate implementation of the functions described above. As shown in FIG. 6, the components include a network communication interface 70, a user interface 72, a processor 74, and data storage 76, all of which may be coupled together or otherwise integrated by a system bus or other connection mechanism 78.

Network communication interface 70 may comprise a wireless and/or wireline communication interface. For instance, the network communication interface of mobile station 44 preferably comprises a wireless communication module arranged to engage in air interface communication with RAN 30, using one of the air interface protocols noted above or another now know or later developed. The mobile station 44 would preferably also operate the network communication interface to receive pilot signals or other signals from base stations in its vicinity and to measure or facilitate measurement of BTS-MS delays of those signals for use as discussed above. The network communication interface in other elements may comprise Ethernet network interface modules or the like, or may take any of a variety of other forms.

User interface 72 may include input and output components for interaction with a user. In mobile station 44, for instance, the user interface may include a display, keypad, microphone, speaker, and other components, to enable a user to direct the mobile station to provide a location based service request. For instance, a user of the mobile station may engage in a wireless web session, browse to an LBSP site, and invoke a link to request a location based service. In response, a browser function on the mobile station may generate and send a location based service request to the LBSP, with program logic in the mobile station functioning to include or add into that request the mobile station's base station delay measurements to facilitate the present method. Other elements shown may include similar or different types of user interfaces if any at all.

Processor 74 may include one or more general purpose processors (e.g., microprocessors) and/or one or more special purpose processors (e.g., application specific integrated circuits). Data storage 76 may then include one or more volatile or non-volatile storage components, such as magnetic, optical, or organic storage components, and may be integrated in whole or in part with processor 74. Data storage may include program instructions (e.g., machine language instructions) executable or interpretable by processor 74 to carry out the various functions described above.

An exemplary embodiment of the present method has been described above. Those of ordinary skill in the art will appreciate that variations from the embodiment described are possible, and that numerous changes may therefore be made while remaining within the true scope and spirit of the invention as described by the claims.

We claim:

1. A method comprising:
receiving at a server via a network communication interface a location based service request transmitted from a mobile station, and receiving with the location based service request a number of base station delay measurements provided by the mobile station without the mobile station having received a request to provide the base station delay measurements;
transmitting the received base station delay measurements from the server to a positioning system via the network communication interface, to enable the positioning system to determine a location of the mobile station based on the base station delay measurements;
receiving from the positioning system the determined location of the mobile station; and
using the received location of the mobile station as a basis to provide a location based service in response to the received location based service request.

2. The method of claim 1,
wherein receiving the location based service request and the base station delay measurements comprises a location based service provider (LBSP) receiving the location based service request with the base station delay measurements,
wherein transmitting the received base station delay measurements to the positioning system comprises the LBSP transmitting to the positioning system a request for location of the mobile station and including the received base station delay measurements with the request for location of the mobile station so that the positioning system receives the base station delay measurements when the positioning system first receives the request for location of the mobile station,
wherein receiving from the positioning system the determined location of the mobile station comprises the LBSP receiving from the positioning system the determined location of the mobile station, and
wherein using the received location of the mobile station as a basis to provide the location based service in response to the received location based service request comprises the LBSP using the received location of the mobile station as a basis to provide the location based service in a response to the mobile station.

3. The method of claim 1,
wherein receiving the location based service request and the base station delay measurements comprises an intermediary in a communication path between the mobile station and a location based service provider (LBSP) receiving the location based service request with the base station delay measurements, and
wherein transmitting the received base station delay measurements to the positioning system comprises the intermediary transmitting to the positioning system the base station delay measurements, the method further comprising the intermediary forwarding the location based service request along to the LBSP.

4. The method of claim 3,
wherein receiving from the positioning system the determined location of the mobile station comprises the intermediary receiving from the positioning system the determined location of the mobile station, and
wherein the intermediary forwarding the location based service request along to the LBSP comprises the intermediary adding the received location to the location based service request and forwarding the location based service request including the determined location along to the LBSP, so that the LBSP receives the determined location when the LBSP first receives the location based service request.

5. The method of claim 4, further comprising the intermediary stripping the base station delay measurements from the location based service request before forwarding the location based service request to the LBSP, so that the LBSP does not receive the base station delay measurements when the LBSP receives the location based service request.

6. The method of claim 3, further comprising the LBSP sending to the positioning system a query for the location of the mobile station,
wherein receiving from the positioning system the determined location of the mobile station comprises the LBSP receiving the determined location provided by the positioning system in response to the query.

7. The method of claim 6, further comprising the intermediary providing the LBSP with an association value usable by the LBSP to obtain the location from the positioning system.

8. The method of claim 1,
wherein receiving the location based service request transmitted from the mobile station comprises receiving the location based service request in a hypertext transfer protocol (HTTP) message transmitted from the mobile station, and
wherein receiving with the location based service request a number of base station delay measurements provided by the mobile station comprises receiving the base station delay measurements in one or more header parameters or other portions of the HTTP message.

9. The method of claim 1, wherein the location is determined at least in part through triangulation based on the base station delay measurements.

10. A method comprising:
receiving via a user interface into a mobile station from a user of the mobile station a request for a location based service;
responsive to the request from the user, the mobile station transmitting via a wireless communication interface a location based service request to a location based service provider (LBSP);
the mobile station including with the transmitted location based service request base station delay measurements usable by a positioning system to compute a location of the mobile station so as to enable the LBSP to provide location based information in response to the location based service request;
the LBSP receiving the location based service request with the base station delay measurements;
the LBSP transmitting to the positioning system a query for the location of the mobile station via a network communication interface and including with the query the received base station delay measurements;
the LBSP receiving from the positioning system in response to the query the location of the mobile station determined by the positioning system based on the base station delay measurements;
the LBSP using the received location as a basis to obtain the location based information to provide in the response to the location based service request; and
the mobile station receiving via the wireless communication interface the response to the location based service request, the response providing the location based information based on location of the mobile station.

11. A method comprising:
receiving via a user interface into a mobile station from a user of the mobile station a request for a location based service;
responsive to the request from the user, the mobile station transmitting via a wireless communication interface a location based service request to a location based service provider (LBSP);
the mobile station including with the transmitted location based service request base station delay measurements usable by a positioning system to compute a location of the mobile station so as to enable the LBSP to provide location based information in response to the location based service request;
an intermediary within a communication path between the mobile station and the LBSP receiving the location based service request, with the base station delay measurements, transmitted from the mobile station;
the intermediary transmitting the received base station delay measurements to the positioning system via a network communication interface;
the intermediary forwarding the location based service request along to the LBSP; and
the mobile station receiving via the wireless communication interface a response to the location based service request, the response providing the location based information based on location of the mobile station, wherein the location of the mobile station was determined by the positioning system based on the base station delay measurements that were provided with the location based service request.

12. The method of claim 11, wherein including the base station delay measurements with the transmitted location based service request comprises including the base station delay measurements in the location based service request, the method further comprising:
the intermediary stripping the base station delay measurements from the location based service request before forwarding the location based service request along to the LBSP, so that the LBSP does not receive the base station delay measurements when the LBSP receives the location based service request.

13. The method of claim 11, further comprising:
the intermediary receiving in response from the positioning system the determined location of the mobile station; and
the intermediary including the received location of the mobile station in the location based service request forwarded to the LBSP, so that the LBSP receives the determined location when the LBSP first receives the location based service request.

14. The method of claim 11, further comprising:
the LBSP sending to the positioning system a query for the location of the mobile station and receiving the determined location provided by the positioning system in response to the query.

15. The method of claim 14, further comprising:
the intermediary providing the LBSP with an association value usable by the LBSP to obtain the location from the positioning system.

16. In a system in which a mobile station transmits a location based service request to a location based service provider (LBSP) and in which a positioning system then determines a location of the mobile station to enable the LBSP to provide the requested location based service, the improvement comprising:
the mobile station being arranged to include in the location based service request base station delay measurements usable by the positioning system as a basis to determine the mobile station's location; and
an entity being arranged to receive the location based service request transmitted from the mobile station and to transmit the included base station delay measurements to the positioning system via a network communication interface to enable the positioning system to determine the location of the mobile station without a need for the positioning system to request the base station delay measurements from the mobile station.

17. The improvement of claim 16, wherein the entity comprises an intermediary in a communication path between the mobile station and the LBSP.

18. The improvement of claim 16, wherein the entity comprises the LBSP.

* * * * *